B. A. PROCTOR.
SAFETY DEVICE FOR MOVING PICTURE PROJECTORS.
APPLICATION FILED JUNE 21, 1917.
1,298,391.
Patented Mar. 25, 1919.
2 SHEETS—SHEET 1.
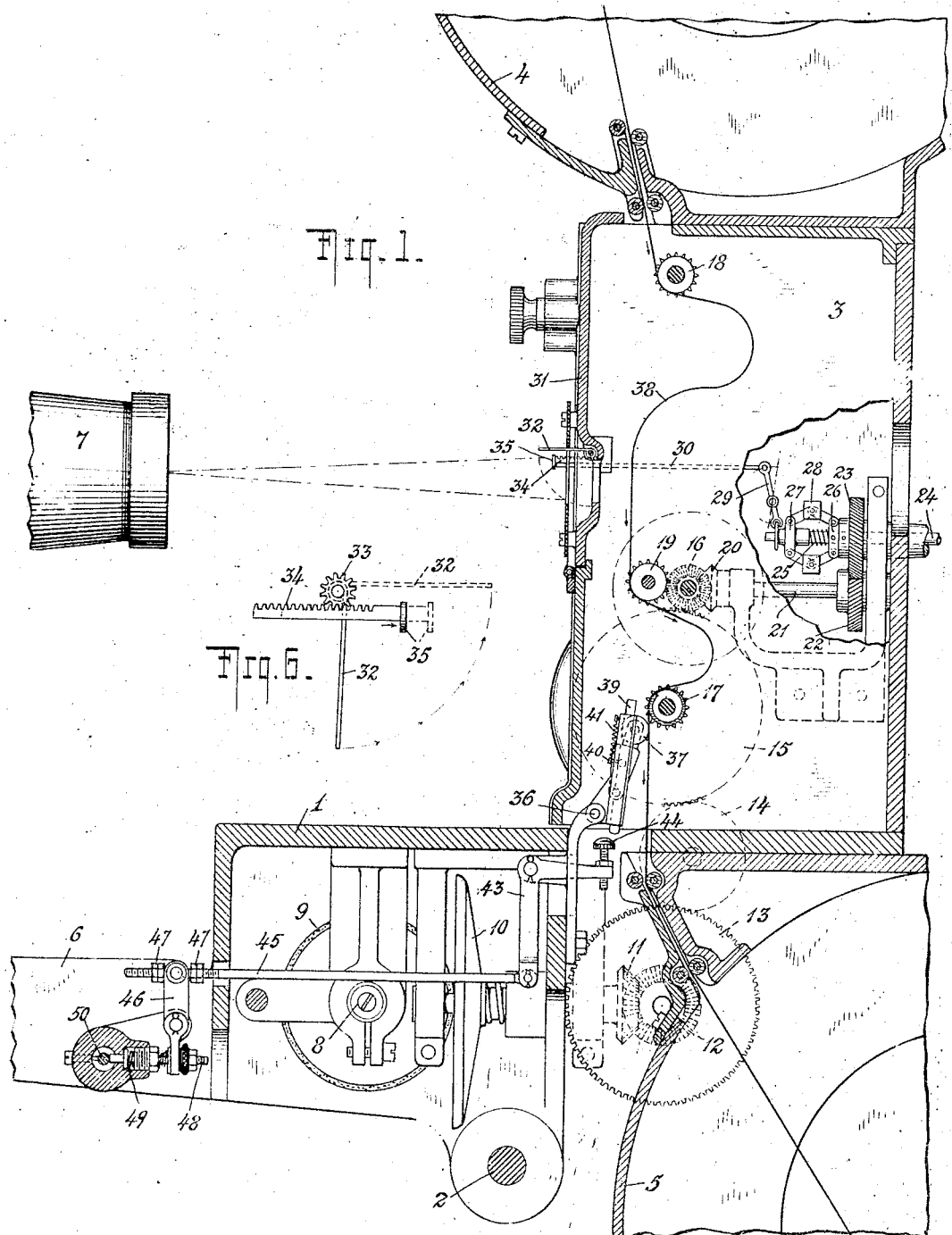
WITNESSES
INVENTOR
BARTON A. PROCTOR
BY
ATTORNEYS B. A. PROCTOR.
SAFETY DEVICE FOR MOVING PICTURE PROJECTORS.
APPLICATION FILED JUNE 21, 1917.
1,298,391.
Patented Mar. 25, 1919.
2 SHEETS—SHEET 2.
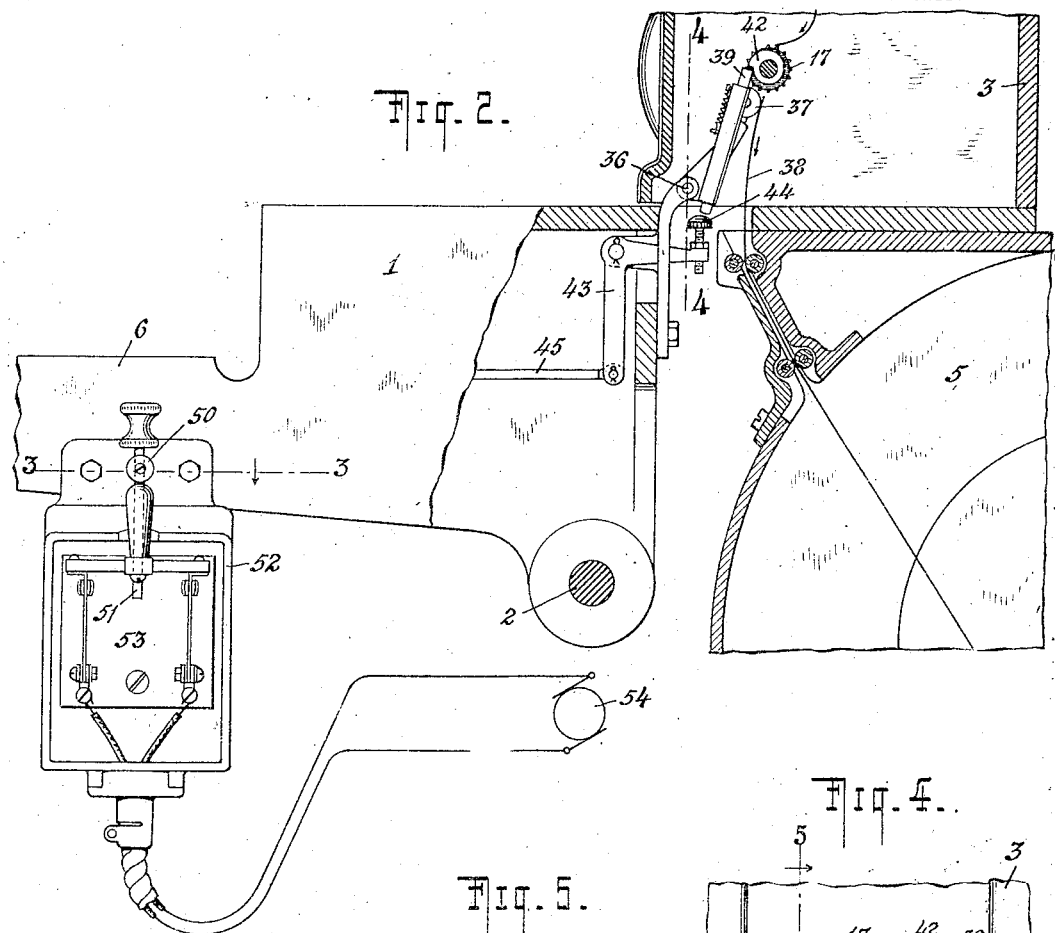
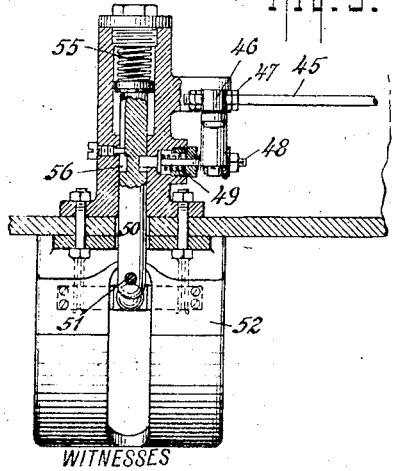
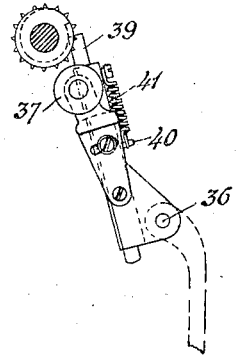
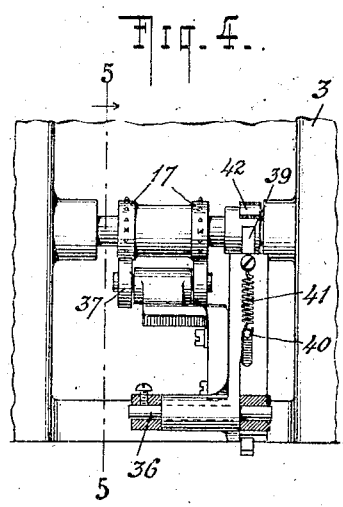
WITNESSES
G. V. Rasmussen
Elmer W. Young
INVENTOR
BARTON A. PROCTOR
BY
Ponissen Schrenk
ATTORNEYS

UNITED STATES PATENT OFFICE.

BARTON A. PROCTOR, OF BRIDGETON, NEW JERSEY, ASSIGNOR TO KINOIKON APPARATUS CORPORATION, OF BRIDGETON, NEW JERSEY, A CORPORATION OF DELAWARE.

SAFETY DEVICE FOR MOVING-PICTURE PROJECTORS.

1,298,391.

Specification of Letters Patent. Patented Mar. 25, 1919.

Application filed June 21, 1917. Serial No. 176,050.

*To all whom it may concern:*

Be it known that I, BARTON A. PROCTOR, a citizen of the United States, residing at Bridgeton, Cumberland county, State of New Jersey, have invented certain new and useful Improvements in Safety Devices for Moving-Picture Projectors, of which the following is a specification.

My invention relates to moving picture projectors and more particularly to such projectors as are employed to project or display pictures arranged successively upon a length or reel of film, as is now common in the art. In commercial practice an electric motor is almost invariably used to drive the film display mechanism.

In the projection of such films it often happens that a film will break, in which case, unless the display mechanism be quickly stopped, the film is apt to pile itself up in the film mechanism housing thus becoming injured or ruined. It is one of the objects of my invention to provide a simple mechanical device or means which, when a film breaks, will instantly and inevitably open the motor circuit thereby cutting off the power and bringing the mechanism to a stop.

Briefly described, this object of my invention is accomplished by providing a pivotally mounted actuating arm or plunger disposed in proximity to a cam or lug fixed to one of the film sprockets and a link or lever system connecting this plunger with the motor switch. During the normal operation of the projector the arm leans against the film, which latter lies between the lug and plunger. Should the film break, or when it has all run off upon the take-up reel, the plunger falls inwardly so as to be struck by the lug, thus giving the plunger a longitudinal thrust which so moves one end of the link or lever system which connects the plunger with the switch that the movable switch member is correspondingly moved so as to open the circuit.

But it is not sufficient merely to stop the display mechanism, inasmuch as this may leave a part of the film in the path of the projector light beam. Owing to the intense heat of the beam and to the inflammable nature of the film, this would almost certainly promptly result in the film taking fire with probable consequent damage to projector, property and life. To avoid this result my invention also includes means cooperating with the circuit breaking means, whereby a safety shutter is necessarily dropped across the path of the light beam whenever display of the film is interrupted, whether by breaking of the film, by the passing of the entire film to the take-up reel, or in any way whatever. It is, hence, a further object of my invention to provide an automatically operated safety shutter of the character described.

Briefly described, this second object of my invention is accomplished by disposing a pivoted drop shutter in the rear wall of the display mechanism housing. The pivotal axis of the shutter is provided with a toothed pinion in mesh with a sliding rack one end of which is engaged with and controlled by a movable element whose position is determined by a device in the nature of a centrifugal governor operatively connected with and driven by the display mechanism. With the display mechanism running above a given rate of speed (previously determined at a rate below which it is not safe to operate on account of fire risk) the rack will be held in a position such that the shutter remains open; below this rate of speed the rack moves into and remains in another position such that the shutter will close and remain closed.

Other objects of the invention will appear as the specification proceeds.

My invention will be better understood by referring to the accompanying drawings in which Figure 1 represents an elevation, principally in section, showing as much of the mechanism of a moving picture projector as is necessary to an understanding of the invention; Fig. 2 is a view, similar to Fig. 1, but showing only those parts which have to do with the action of the switch operating mechanism when a film breaks during its display; Fig. 3 is a plan view, partly in section, taken along the line 3—3 of Fig. 2; Fig. 4 is a detail, viewed from the left, taken along the line 4—4 of Fig. 2; Fig. 5 is a view of the sprocket wheel cam and actuating plunger taken along the line 5—5 of Fig. 4; and Fig. 6 is a detail view, enlarged, of the drop shutter with its pinion and actuating rack, as shown in Fig. 1.

Referring to the drawings a base or platform 1, adapted to be pivotally mounted upon a suitable pedestal (not shown), so as to be adjustable about a transverse journal 2, carries the fixedly attached housing 3, for the film display mechanism, which is provided above and below, respectively, with the film feed reel casing 4 and the take-up reel casing 5. Integrally attached arms 6 at the left of the base support the projecting lantern of which only the lens 7 is shown.

The film display mechanism is contained within the housing 3 and is driven by driving gear contained within the base 1, by an electric motor (not shown).

The driving gear comprises a main shaft 8 directly connected with the motor shaft, having keyed to it a linearly slidable friction drive disk 9 from which is driven another friction disk 10 which is keyed to a shaft terminating in a bevel gear 11 in mesh with and arranged to drive a similar gear 12. Fixed to the same shaft as gear 12 is a spur gear 13 which, through intermediate gears 14, 15, 16 and others not shown, eventually imparts a continuous positive motion to the two sprocket wheels 17 and 18 and an intermittent motion to the sprocket wheel 19, all of which sprocket wheels engage the film in the usual way and feed the same intermittently in the path of the light beam.

Bevel gear 16 also meshes with a similar gear 20 fixed to shaft 21 which carries a spur gear 22 meshing with another spur gear 23 fixed to shaft 24; fixed to this shaft 24 so as to rotate therewith is the usual shutter (not shown).

Transversely disposed upon shaft 24 and separated from one another by a helical spring 25 are two parallel bars 26 and 27, the former being pinned fast to the shaft and the latter being fixed to a sleeve and longitudinally slidable upon the shaft. Corresponding ends of these bars are pivotally attached to the outer ends of a pair of links whose inner ends are pivotally connected to and joined by weights 28.

The outer end of the sleeve is flanged and this flange lies between the fingers of the forked end of a pivoted lever 29 whose other end is pivotally attached to a rack rod 30; the outer end of this rack rod lies in a slideway formed in the rear wall or door 31 of the housing 3.

Immediately above an opening which is provided in this door in the path of the light beam is mounted a pivotal shaft to which is fixed a drop shutter 32 and a pinion 33; pinion 33 meshes with a short rack 34 slidably mounted in door 31 and has a transverse push bar 35 fixed to its outer end. Owing to the weight of the shutter the normal tendency of rack 34 is to move inwardly and push bar 35 is so located that it is thereby constantly pressed against the end of rack rod 30.

Pivotally attached at 36 to the end of a bracket fixed to base 1 is an arm carrying a pair of spaced and freely rotatable distance wheels 37 adapted, when the film 38 is engaged with the several sprocket wheels 17, 18 and 19 and in position for projection, to rest lightly against the film as shown in Fig. 1; also slidably mounted in a sleeve comprising part of the same arm, is a plunger 39 carrying a pin 40 which fits within a slot formed in the sleeve. A tension spring 41 connected between a screw in the sleeve and the pin 40 holds the plunger normally in an outer limiting position.

Sprocket wheel 17 carries an annular cam segment whose face 42 is adapted to engage the outer end of plunger 39 and depress the same again the resistance of spring 41 should the arm carrying the plunger be permitted to move inwardly to a sufficient extent, as it would were the film to break, as shown in Fig. 2, or were the film absent altogether.

A bell crank lever 43 pivotally mounted within the base 1 has one arm carrying an adjustable stud 44, a nut being employed to hold the stud in any desired fixed position, and its other arm connected with a rod 45. The outer end of rod 45 is pivotally connected with one end of a lever 46 which is itself pivotally fastened to a bracket mounted upon the forward one of the arms 6. Nuts 47, upon rod 45 on each side of lever 46, permit the point of connection between rod and lever to be shifted.

The other end of lever 46 is attached to the outer end of a lock pin 48 which is normally pressed inwardly by a spring 49 against a switch release rod 50 slidably held in the same mounting attached to arm 6 which carries the lever 46. Fixed vertically in the outer end of release rod 50 is a pin 51.

Mounted in a housing 52 carried upon the forward arm 6 is a double pole switch 53 of usual construction through which is run the circuit which connects the electric supply source 54 to the driving motor (not shown).

A spring 55 is interposed between the end of release rod 50 and the mounting in which the rod moves. Rod 50 is also provided with an annular slot 56 into which the end of lock pin 48 drops under the pressure of spring 49 when rod 50 is pushed backwardly against the resistance of spring 55 to a sufficient extent.

The operation of the projector with my invention embodied therein as above described is as follows: Let it be assumed that the film 38 has been mounted on the feed reel 4 with its end threaded through the gates of the reel housings and properly engaged with the sprocket wheels 17, 18 and 19, all as shown in Fig. 1. Let it be assumed also that switch 53 is closed as shown in Fig. 2 and that the mechanism is therefore operating. In this case the switch bar rests in contact with or immediately in front of pin 51 and release rod 50 to which said pin is attached is pushed to its limiting backward position, thus holding spring 55 in compression and being itself held in place by the engagement of lock pin 48 with annular slot 56.

The arm carrying distance wheels 37 is overbalanced to the right as shown in Fig. 1 so that the distance wheels lie against the film 38.

Driving shaft 8 connected with the motor (not shown) is through friction gears 9, 10 and other gears, some of which are shown and some not shown, rotating sprocket wheels 17, 18 and 19 so as to feed film 38 downwardly as shown by the arrow and upon the take-up reel mounted in housing 5. Shutter shaft 24 is also rotating and weights 28 have assumed a certain position with reference to shaft 24 corresponding to the speed at which the mechanism is being driven. Above the limiting speed necessary for good projection this position of the weights 28 is such as to cause lever 29 to assume a position which will thrust rack rod 30 to the rear sufficiently to so rotate pinion 33 as to bring drop shutter 32 into horizontal position, thereby uncovering the opening in door 31 so as to admit of the passage of the light beam to and through the film.

As long as the film continues unbroken and to be driven at an appropriate speed so long will the position of the parts as just described and as shown in Fig. 1 remain substantially the same. Should the film break, however, the arm carrying distance wheels 37 and plunger 39 will no longer be restrained by the film from falling inwardly. The result will be that the instant the film breaks plunger 39 will drop toward the shaft of sprocket wheel 17 and its end be engaged by cam face 42. The plunger will thus be depressed so that its lower end will strike stud 44 thus operating bell crank lever 43 and, through rod 45, actuating lever 46 so as to disengage lock pin 48 from annular slot 56. This permits spring 55 to throw release rod 50 forwardly thus causing bar of switch 53 to be engaged by pin 51 so as to open the switch and break the circuit operating the motor.

Cam face 42, when it has fully depressed plunger 39, will readily slip past the plunger and continued rotation of the shaft to which the cam is attached will simply idly repeat its action upon the plunger until the mechanism comes to an actual stop.

As soon as switch 53 is opened and the motive power cut off the mechanism is of necessity stopped very quickly. This causes weights 28 to be swung in toward shutter shaft 24 under the influence of spring 25, thus moving lever 29 and rack rod 30 to the right (Fig. 1). Drop shutter 32 is thereby permitted to fall and close the opening in door 31 so as to cut off the light beam. Even though the film may pile up in the housing 3 due to continued movement of the mechanism for a short interval after operating circuit has been cut off, no danger of fire is incurred since the drop shutter acts almost instantaneously and completely cuts off the light beam from the film.

If, instead of there being a breakage of the film, the operator simply forgets to attend to his duties or is called away therefrom and the projection of the reel should happen to be completed so that the entire film passes on to the take-up reel, the mechanism will be stopped in exactly the same way as has just been described for the case when a film actually breaks. No matter for what reason, the film depending from the lowest sprocket wheel 17 is absent, plunger 39 is thereby permitted to lie in an inward limiting position such that its end can be engaged by cam face 42. Under such circumstances it will be impossible to keep the switch closed and the mechanism in operation.

Various changes of detail in the construction and arrangement of parts may be made within the spirit and scope of the invention as set forth in the following claims:

1. In a moving picture projector, a power source, film display mechanism driven by said power source, means adapted to be actuated so as to cut off the power source from the display mechanism said means being normally held by the film in inoperative position, and an actuating member moving with the display mechanism for engaging and actuating the cutting off means.

2. In a moving picture projector, a power source, film display mechanism driven by said power source, a plunger normally resting against the film, a cam moving with the display mechanism on the other side of the film and adapted to engage and depress the plunger when the film is absent or broken, and means controlling the power source and arranged to be operated by the plunger when depressed so as to cut off the power source from the display mechanism.

3. In a moving picture projector, a film display mechanism adapted to be driven by a motor, a switch for controlling said motor, means for opening said switch operatively connected therewith and comprising a movable member normally held in inoperative position by the film, and a cam moving with the display mechanism and adapted to engage the movable member when the film is broken or absent so as to actuate the switch opening means.

4. In a moving picture projector, a film display mechanism adapted to be driven by a motor, a switch for controlling said motor, switch opening means connected with the switch, a cam movable with the display mechanism, and a connection between the switch opening means and the cam for operating the former and opening the switch, the cam and connection being normally kept apart by the film.

5. In a moving picture projector, a film display mechanism adapted to be driven by a motor, a switch for controlling said motor the switch being kept normally open by a spring, a locking pin for holding said switch closed, a cam rotatable with the display mechanism, a pivoted plunger disposed to lean against the film when this is being displayed and to be engaged and depressed by the cam when the film is broken or absent, and a connection between the locking pin and the plunger whereby the switch is released and allowed to open when the plunger is depressed.

In testimony whereof I have hereunto set my hand.

BARTON A. PROCTOR.